United States Patent [19]
Barbunopulos

[11] Patent Number: 5,735,178
[45] Date of Patent: Apr. 7, 1998

[54] ACTUATING DEVICE FOR A PARKING BRAKE

[75] Inventor: Vasil Barbunopulos, Vaihingen, Germany

[73] Assignee: Ing. h.c.F. Porsche AG, Weissach, Germany

[21] Appl. No.: 653,027

[22] Filed: May 24, 1996

[30] Foreign Application Priority Data

Jun. 9, 1995 [DE] Germany .......... 195 21 159.6

[51] Int. Cl.⁶ .................................... B60T 7/08
[52] U.S. Cl. .................................. 74/535; 74/538
[58] Field of Search ................ 74/535, 536, 537, 74/538

[56] References Cited

U.S. PATENT DOCUMENTS 3,722,318  3/1973  Asou et al. .............. 74/535
4,512,210  4/1985  Gurney ................... 74/535

FOREIGN PATENT DOCUMENTS

| | | |
|---|---|---|
| 456097 | 11/1991 | European Pat. Off. ........ 74/535 |
| 0 565 768 | 10/1993 | European Pat. Off. . |
| 2583362 | 12/1986 | France ......................... 74/538 |
| 21 13 716 | 10/1971 | Germany . |
| 34 28 156 | 2/1986 | Germany . |
| 36 22 479 | 1/1988 | Germany . |
| 4126649 | 4/1992 | Japan ........................... 74/538 |
| 6056009 | 3/1994 | Japan ......................... 784/538 |
| 6174060 | 6/1994 | Japan ........................... 74/538 |
| 333766 | 12/1958 | Switzerland . |

*Primary Examiner*—Charles A. Marmor
*Assistant Examiner*—Mary Ann Battista
*Attorney, Agent, or Firm*—Evenson, McKeown, Edwards & Lenahan, P.L.L.C.

[57] ABSTRACT

An actuating device for a parking brake with a shell-shaped handbrake lever essentially comprises a locking device that includes a detent segment with a detent pawl. The device is operated by an actuating rod. The handbrake lever is composed of half-shells enclosed by a cover strip with bearing bushings for the locking device as well as for pivotable mounting in a pedestal bearing that is mounted on the body. The connected half-shells are each provided with molded tubular guide projections for the actuating rod. The latter is connected with a one-piece handle that slips over it, producing, together with the cover strip and the half-shells, a flat continuous outer surface for the handbrake lever.

11 Claims, 6 Drawing Sheets

ACTUATING DEVICE FOR A PARKING BRAKE

BACKGROUND AND SUMMARY OF THE INVENTION

The invention relates to an actuating device for a parking brake and, more particularly, to an actuating device having a shell-shaped handbrake lever. A locking device is mounted in the lever so as to surround a detent segment with a detent pawl. The device is operated by an actuating rod.

From German Patent document DE-OS 21 13 716, an actuating device for a parking brake is known, in which the handbrake lever is composed of half-shells. A locking device is received between the half-shells. The locking device is connected with an actuating rod.

There is therefore needed an improved actuating device for a parking brake, which is premountable as an assembly, constitutes a compact device, and is readily mountable in the vehicle.

These needs are met according to the present invention by an actuating device for a parking brake having a shell-shaped handbrake lever. A locking device is mounted in the lever so as to surround a detent segment with a detent pawl. The device is operated by an actuating rod. The handbrake lever includes half-shells covered by a cover strip with bearing bushings for the locking device as well for a pivotable mounting in a pedestal mounted on the body. Associated half-shells each have molded tubular guide projections for the actuating rod that are connected with a one-piece handle that can be slid over them. The handle, together with the cover strip and the half-shells produce a flat, continuous outer surface for the handbrake lever.

The primary advantages achieved by the present invention include the fact that the handbrake lever consists of shells, i.e. the two side housing parts of the lever are made in the form of half-shells and are enclosed by a cover strip at the top. These shells are simply connected together by screws, rivets, or similar fastening device. The half-shells are designed internally with integrated moldings that provide a bearing for a locking device with an actuating rod. This bearing is in the form of a tubular molding in the half-shells.

The cover strip forms an upper closure for the half-shells of the handbrake lever and is clipped onto the side parts of these half-shells in a simple fashion without additional fastening devices. This produces lateral connecting edges and avoids a connecting edge on the top which would otherwise result if the half-shells were to be joined without a cover strip. Thus, a bilateral edge is formed that marks the path of the seam of a leather covering.

The cover strip, as well as a handle pushed onto the tubular molding, form a continuous surface together with the half-shells.

The locking device, essentially consisting of a detent pawl, a detent segment, and an actuating rod, is preassembled. The detent pawl and actuating rod are premounted in the half-shells. This results in a compact assembly that can be preset and assembled outside the vehicle as a module or unit. Fitting the module into a pedestal bearing connected to the vehicle body considerably facilitates installation in the vehicle.

Through the use of internal bushings molded inside the half-shells for pivotable reception of the detent pawl, and additional molded internal bushings to receive a bearing bushing, which are held in the pedestal bearing, a component handbrake lever is created which is simple to premount and which can be assembled in a few steps.

An externally molded external bushing to mount the handbrake lever has a molded rib for cooperating with a contact switch mounted in the pedestal bearing. The rib simultaneously supports the external bushing. A molded lever simultaneously is provided for connection with a tension rod for a Bowden cable for the wheel brake.

The two half-shells are joined simply by screws in the vicinity of the bearing plate as well as riveting between the transverse legs of the half-shells, with additional connections being provided in the vicinity of the cover strip by parallel running legs of the half-shells.

Within the two half-shells, projections are provided on both sides of the detent segment for lateral guidance thereof.

The pedestal bearing for the handbrake lever forms a stable connection with the vehicle body and has at least four supporting feet. The pedestal bearing is designed so that the handbrake lever can be mounted simply and the detent segment attached in such fashion that an active connection with the detent pawl in the handbrake lever can be made without costly adjustment. The contact switch as well as the detent segment are mounted on different walls or legs of the pedestal bearing, with the connecting rod being guided rearward in a tunnel relative to the direction of travel.

In order to eliminate a dirt-collecting connecting groove on top of the handbrake lever, the cover strip is clipped onto the half-shells so that lateral joints result. A flat roof-shaped plate covering the half-shells produces a dirt-free upper seal for the handbrake lever as well as a covering for an intermediate space left in the center console connected with the pedestal bearing.

Other objects, advantages and novel features of the present, invention will become apparent from the following detailed description of the invention when considered in conjunction with the accompanying drawings.

DETAILED DESCRIPTION OF THE DRAWINGS

Figure 1:
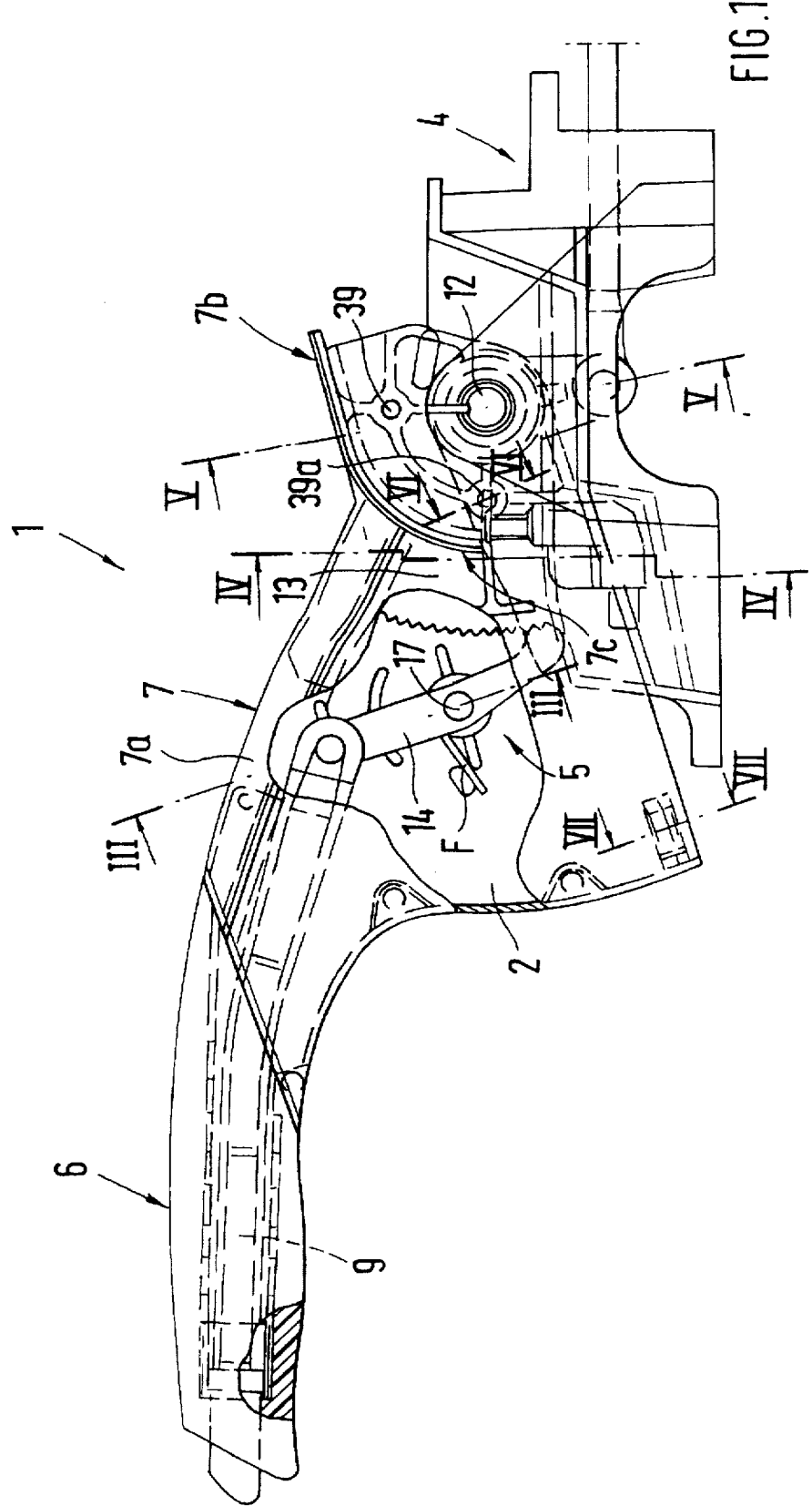
FIG. 1 is a side view of a handbrake lever with a pedestal bearing.

Referring to FIG. 1, an actuating device 1 includes a basic body of a handbrake lever composed of a housing in the form of two half-shells 2, 3. This lever is connected with a pedestal bearing 4 (see also FIG. 14) mounted on the body and encloses a locking device 5 as well as bearings therefor.

The half-shells 2, 3 are connected with a handle 6 and with a cover strip 7 adjacent to the handle 6. The cover strip 7 seals the half-shells 2, 3 at the top in a flush manner.

Figure 2:
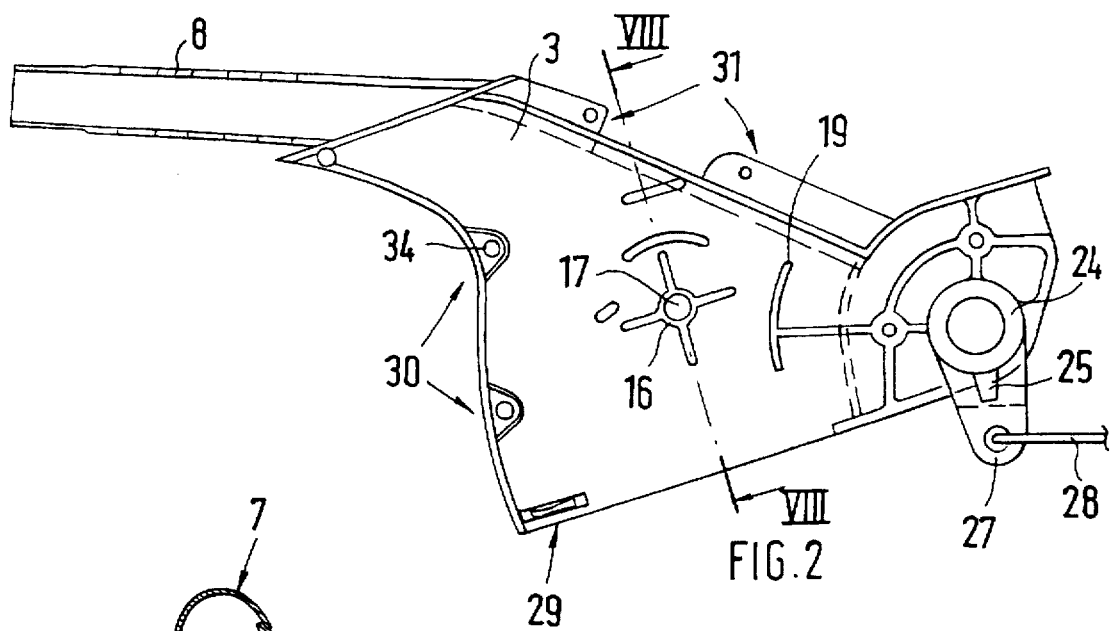
FIG. 2 is a side view of one half-shell of a handbrake lever.
Figure 4:
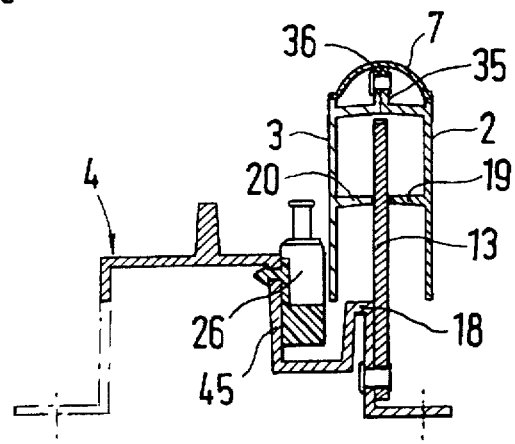
FIG. 4 is a section view taken along line IV—IV through the handbrake lever according to FIG. 1 in the vicinity of the detent segment.
Figure 5:
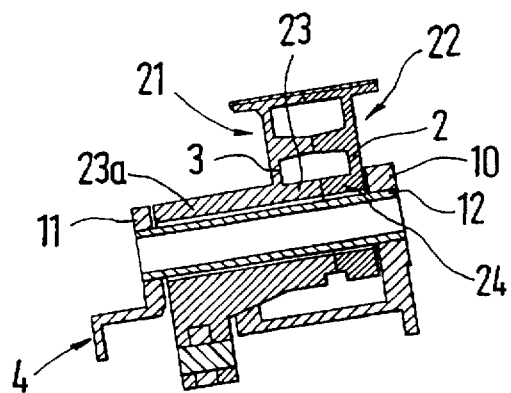
FIG. 5 is a section view taken along line V—V through the handbrake lever according to FIG. 1 in the vicinity of the bearing.
Figure 6:
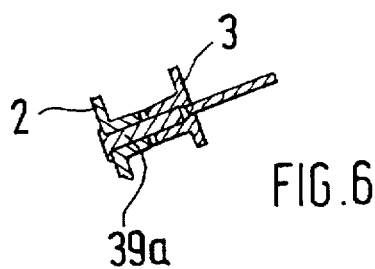
FIG. 6 is a section view taken along line VI—VI through a screw connection of the two half-shells according to FIG. 1.
Figure 7:
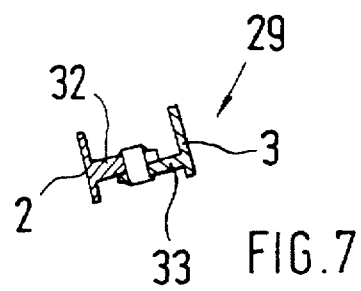
FIG. 7 is a section view taken along line VII—VII through a riveted connection of the two half-shells according to FIG. 1.
Figure 8:
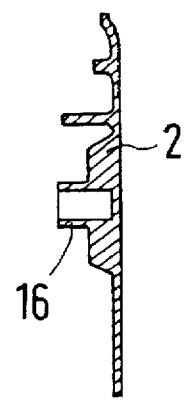
FIG. 8 is a section view taken along line VIII—VIII through the bearing of the detent pawl according to FIG. 2.
Figure 9:
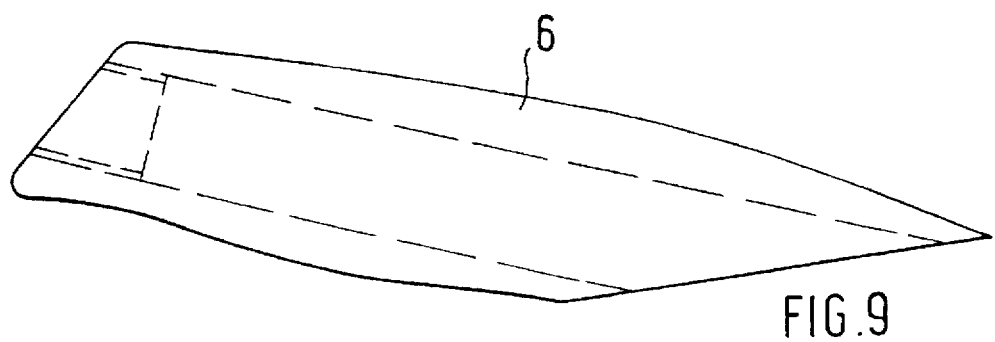
FIG. 9 is a side view of a handle of the handbrake lever.
Figure 10:
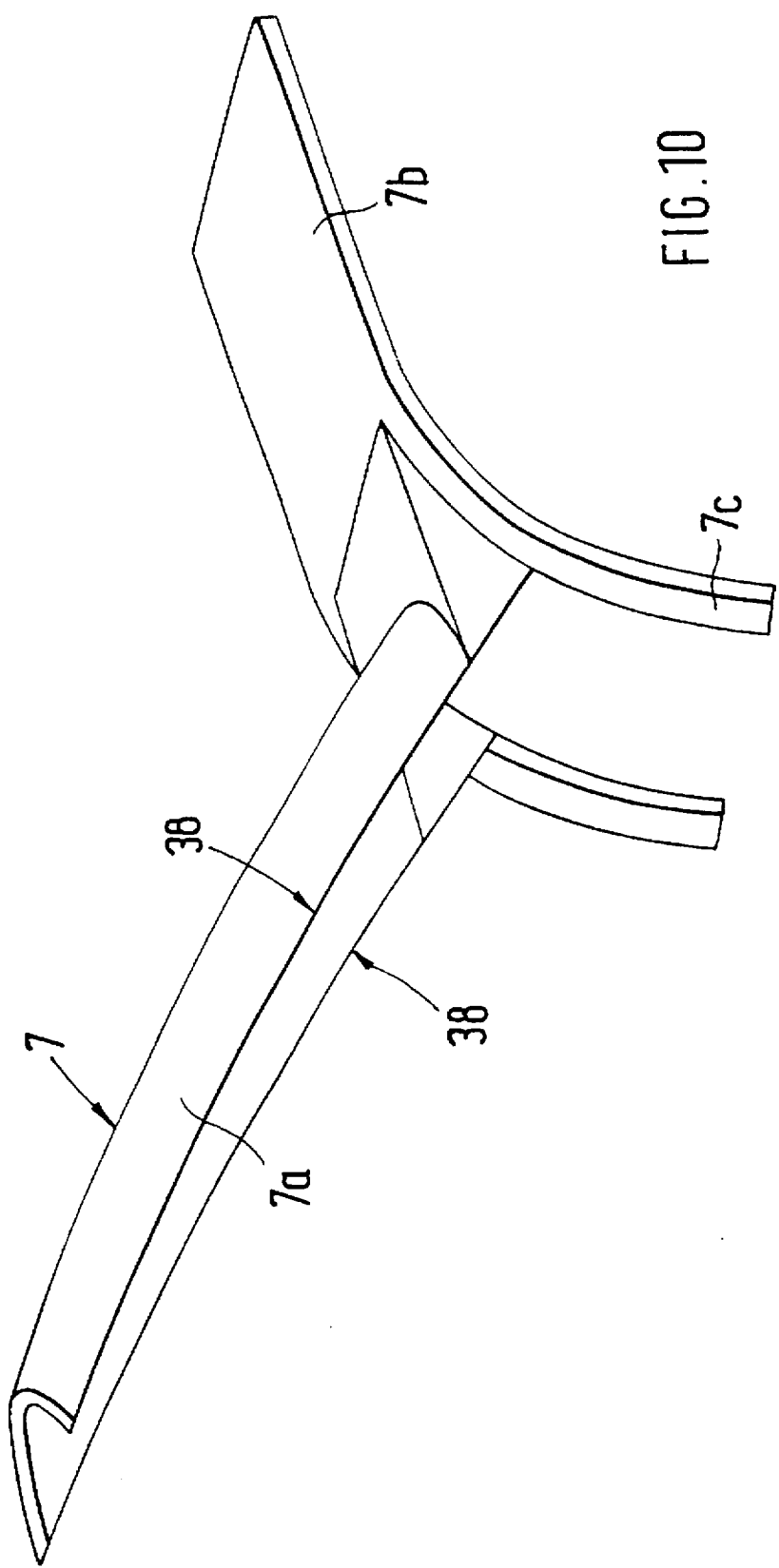
FIG. 10 is a perspective view of a cover strip.

As shown in greater detail in FIG. 2, half-shells 2, 3 each have semicircular projections 8 assembled to form a tubular guide to receive the handle 6 and for lengthwise guidance of an actuating rod 9 connected with the locking device 5. The handbrake lever is pivotably mounted in the pedestal bearing 4 between legs 10, 11 (FIG. 14) on a bearing sleeve 12. To receive the bearing sleeve 12 or the bearing tube, the half-shells 2, 3 have bearing plates 21, 22 with molded internal bushings 23, 24 that have bilateral endwise projections to prevent twisting. One internal bushing 23 projects outward as an external bushing 23a and is supported by ribs 25 (FIG. 2). One of the ribs 25 is located so that when the handbrake lever is in the non-applied position, the rib 25 can actuate a contact switch 26 (FIG. 4) on pedestal bearing 4. Similarly, a lever 27 is cast on the external bushing 23a and is connectable with a tension rod 28 (FIG. 2).

Through the use of the locking device 5, which consists of a detent segment 13 and a detent pawl 14 that can be moved by the actuating rod 9, the handbrake lever can be adjusted in its various positions to actuate the brake.

Internal bushings 15, 16 (FIG. 3) molded to receive the detent pawl 14 are provided in the half-shells 2, 3. The internal bushings 15, 16 have a bearing pin 17 for the detent pawl 14. This detent pawl 14 is pretensioned by a spring element F. Detent segment 13 is mounted in the pedestal bearing 4 on a leg 18. A lateral guidance of the detent segment 13 is provided between projections 19, 20 (FIGS. 2 and 4) molded inside the half-shells 2, 3.

The half-shells 2, 3 are fastened together by a plurality of connections 29, 30, 31. A first connection 29 is provided by crosswise legs 32, 33 on the half-shells 2, 3 and is produced by riveting, screwing, or the like. An additional connection 30 is provided by locking pins 34 that engage recesses. Opposite, parallel legs 35, 36 (FIG. 4) of the half-shells 2, 3 are connected by screws or similar connecting devices. In the vicinity of the bearing plates 21, 22, additional screws 39, 39a are provided to connect the half-shells 2, 3.

Figure 3:
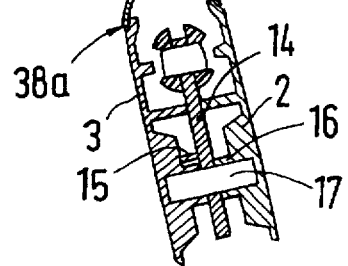
FIG. 3 is a section view taken along line III—III through the handbrake lever according to FIG. 1 in the vicinity of the detent pawl.
Figure 11:
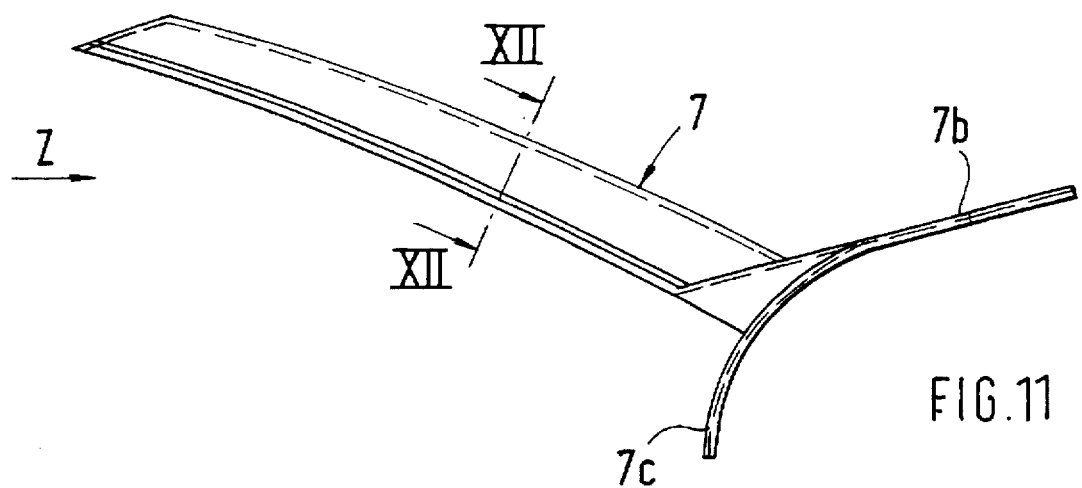
FIG. 11 is a side view of the cover strip.
Figure 12:
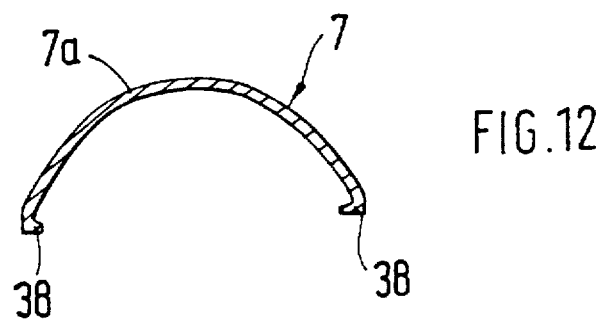
FIG. 12 is a section view taken along line XII—XII of the cover strip according to FIG. 11.
Figure 13:
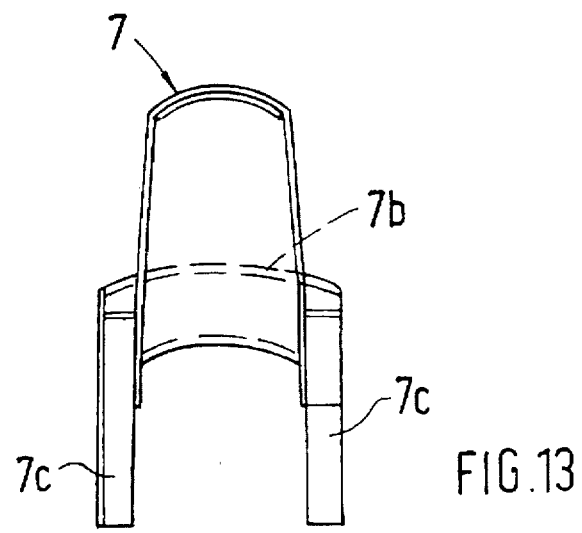
FIG. 13 is a view of the cover strip looking in the direction of arrow Z.

The cover strip 7 provided on the top of the two half-shells 2, 3 according to FIGS. 11 to 13 includes a section 7a which is elongate, molded to be semicircular in cross section, and adjoins handle 6 and the outer surfaces of the half-shells 2, 3 in a flush manner. This section 7a has hook rivets 38 on its lengthwise edges which are clipped into corresponding recesses 38a (FIG. 3). This elongate section 7a is adjoined by a flat plate 7b, which the bearing plates 21, 22 overlap and enclose from above. Molded strips 7c adjoin the bearing plates 21, 22 edgewise.

Figure 14:
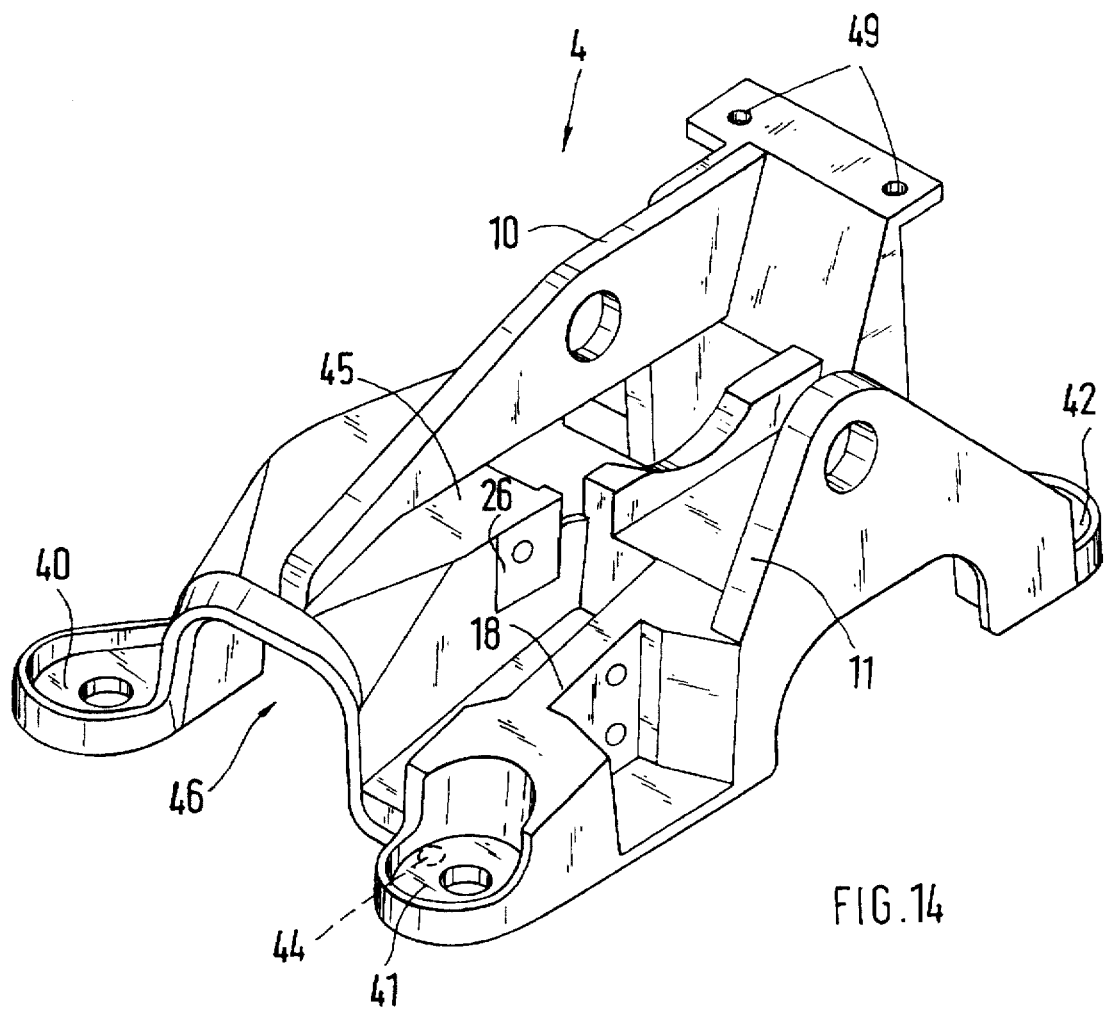
FIG. 14 is a perspective view of the pedestal bearing.

Referring to FIG. 14, the pedestal bearing 4 for pivotable reception of the handbrake lever has at least four supporting feet (of which three are shown 40, 41, 42). At least two feet are provided with pins 44 on the bottom that allow exact positioning of the pedestal bearing 4 on the body. In addition, mounting holes 49 are provided to receive an adjoining center console. As a result, the pedestal bearing 4 and, hence, the handbrake lever are located in a correct position. One retaining leg 18 of the pedestal bearing 4 serves to receive the locking detent segment 13, while another retaining leg 45 of pedestal bearing 4 serves to receive the contact switch 26. The tension rod 28 and the cable strands are guided lengthwise in a cavity 46 of the pedestal bearing 4 that is U-shaped in cross section.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An actuating device for a parking brake, comprising:
   a handbrake lever having a shell-shaped housing formed by two half-shells;
   a locking device mounted in said handbrake lever including a detent segment and a detent pawl, said shell-shaped handbrake lever surrounding the detent segment and the detent pawl;
   an actuating rod operating said actuating device;
   a cover strip covering said two half-shells forming the handbrake lever;
   wherein said two half-shells include bearing bushings for the locking device and for a pivotable mounting in a pedestal which is mounted on a vehicle body;
   wherein associated ones of said two half-shells each have molded tubular guide projections for the actuating rod that are connected with a one-piece handle which is slid over said guide projections; and
   wherein said one-piece handle, together with said cover strip and said two half-shells, produces a flat continuous outer surface for said handbrake lever.

2. An actuating device according to claim 1, wherein said two half-shells have molded internal bushings forming an integrated bearing for the detent pawl, said molded internal bushings pivotably holding the detent pawl on a bearing pin, and further wherein the detent pawl is pretensioned via a spring element.

3. An actuating device according to claim 1, further wherein said two half-shells each have a bearing plate with molded internal bushings abutting one another and prevented from twisting, said bearing plates being held between legs of said pedestal on a bearing bushing.

4. An actuating device according to claim 1, wherein one of said two half-shells has an additional external bushing supported via ribs on said one half-shell and wherein one of said ribs cooperates with a contact switch mounted on the pedestal.

5. An actuating device according to claim 4, wherein said additional external bushing has a downwardly projecting cast lever connected with a tension rod.

6. An actuating device according to claim 1, further comprising a detent segment mounted on the pedestal, said detent segment engaging the detent pawl and being guided between inner projections of said two half-shells molded on both sides.

7. An actuating device according to claim 1, further comprising a link between said two half-shells provided by a connection located in a foot between two molded crossed legs and by screws in the vicinity of bearing plates of said two half-shells;
   wherein said two molded crossed legs are brought and connected together and surrounded by the cover strip.

8. An actuating device according to claim 1, wherein the pedestal and said two half-shells are formed of a light-metal alloy casting.

9. An actuating device according to claim 1, wherein the pedestal includes a foot part having at least four support feet with locking pins molded-in at least two of said four support feet; and further wherein the pedestal includes a retaining leg for the detent segment and an additional retaining leg for a contact switch;

said pedestal having a cross-sectional U-shaped cavity extending lengthwise through which a tension rod and cable strands are guided between the support feet.

10. An actuating device according to claim 1, wherein the cover strip includes, in the vicinity of the handbrake lever, a first section having a semicircular cross-section running lengthwise; and wherein in the vicinity of bearing plates of the two half-shells, said cover strip surrounds the two half-shells from above with a flat plate, said flat plate being forwardly guided around the bearing plates in an arc via strips.

11. An actuating device according to claim 10, wherein the cover strip includes hook strips extending lengthwise, said hook strips cooperating with matching recesses in said two half-shells, wherein said cover strip is clippable to said two half-shells.

* * * * *